US006169597B1

(12) United States Patent
Sala

(10) Patent No.: US 6,169,597 B1
(45) Date of Patent: Jan. 2, 2001

(54) CONTAINER TO MANAGE AND PROCESS PHOTOGRAPHIC MATERIAL AND RELATIVE AUTOMATED SYSTEM OF MANAGEMENT AND PROCESSING

(76) Inventor: Giampaolo Sala, Via Padova, 60, 30030 Vigonovo (VE) (IT)

(*) Notice: Under 35 U.S.C. 154(b), the term of this patent shall be extended for 0 days.

(21) Appl. No.: 09/202,065

(22) PCT Filed: Jun. 9, 1997

(86) PCT No.: PCT/IB97/00667

§ 371 Date: Dec. 8, 1998

§ 102(e) Date: Dec. 8, 1998

(87) PCT Pub. No.: WO97/48018

PCT Pub. Date: Dec. 18, 1997

(30) Foreign Application Priority Data

Jun. 12, 1996 (IT) ............................................ UD96A0095
Jun. 12, 1996 (IT) ............................................ UD96A0096

(51) Int. Cl.[7] .......................... G03B 13/08; G03B 27/52; G03D 17/26

(52) U.S. Cl. ................................ 355/40; 355/27; 355/41; 355/75; 396/567; 396/570; 396/647

(58) Field of Search .................................... 396/310, 311, 396/512, 567, 570, 612, 624, 647, 564, 648; 221/75, 76, 87; 355/75, 40, 27, 41; 242/559.3, 559.4

(56) References Cited

U.S. PATENT DOCUMENTS 5,032,707 * 7/1991 Gudmundson et al. ............... 355/40
5,229,802 * 7/1993 Shiota et al. ......................... 396/512
5,347,338 * 9/1994 Weibel ................................. 396/647
5,450,160 * 9/1995 Tianello et al. ...................... 396/564
5,488,448 * 1/1996 Merie et al. ......................... 396/647
5,523,816 * 6/1996 Sherman et al. ..................... 396/647
5,600,394 * 2/1997 DeCook et al. ...................... 396/647
5,781,819 * 7/1998 Brunner et al. ...................... 396/564
5,825,462 * 10/1998 Miyamori et al. ..................... 355/75
5,870,177 * 2/1999 Yoshikawa ........................... 396/512
5,873,541 * 2/1999 Reibi et al. ....................... 242/559.3

FOREIGN PATENT DOCUMENTS 19502826 1/1995 (DE) .
19535449 9/1995 (DE) .
234833 9/1987 (EP) .
712043 5/1996 (EP) .

* cited by examiner

*Primary Examiner*—Alan A. Mathews
(74) *Attorney, Agent, or Firm*—Antonelli, Terry, Stout & Kraus, LLP

(57) ABSTRACT

A container for a system to collect, manage, process and move photographic material, contained in wrappers of a defined form, for example rolls (24) is associated with an automatic device to collect the photographic material to be processed and also with at least a processing machine (13, 14) including its own data processing unit (41). The automatic collection device includes means to recognize the client (28), means (29) to input commands and aperture means (23) for the introduction of the roll (24). The container (30) includes a plurality of individually accessible locations to position the rolls (24) in an orderly manner and memorization means (12) solid with the container, the memorization means (12) being able to be functionally associated with the means to recognize the client (28) for the univocal identification of the specific roll (24) and with the data processing unit (41) of the processing machine (13, 14) to transfer the univocal identification of the specific roll (24), and the container (30) including closure means (43, 143) and cooperating with moving means (35, 46, 74), the container (30) cooperating with devices (65, 165) for the automatic extraction of the rolls (24).

17 Claims, 8 Drawing Sheets

24
30
32
46
49
50
56
57
58
59
60
61
62
63
64
79
143

CONTAINER TO MANAGE AND PROCESS PHOTOGRAPHIC MATERIAL AND RELATIVE AUTOMATED SYSTEM OF MANAGEMENT AND PROCESSING

FIELD OF APPLICATION

This invention concerns a container to manage and process photographic material and the relative automated system of management and processing.

The invention is used in the automated management of the collection and processing of photographic material, generally speaking in the form of rolls containing the film to be developed.

The invention is used both for the automatic collection of rolls of film from the clients by means of an automatic collecting device, and also for the processing steps in the various processing stations and the movement of the photographic material from one processing station to another.

To be more exact, with this invention it is possible to use the same container for the automatic collection of the photographic material from the clients and also for the processing of the photographic material, at least in the first of the processing stations, advantageously in a plurality thereof; this accelerates and rationalises all the operations and makes the management and movement of the photographic material extremely practical and simple.

STATE OF THE ART

The state of the art covers those commercial enterprises which collect photographic material and wherein the photographic material handed in by the clients, such as for example rolls of photographic film, is placed in the appropriate envelopes on which the identification data of the client, and that of the process to which the photographic material contained therein is to be subjected, is written manually.

In photographic laboratories and in integrated machines designed to carry out the relative processing, the material contained in the envelopes, for example rolls of film, is selected by the worker according to pre-established criteria such as the print format, the type of process, the order etc., and placed in the appropriate containers, in order to obtain a batch of material which can be moved in a homogeneous manner between the various work stations, thus increasing the productivity of the processing machines and/or managing the final product in the appropriate manner.

In the case of a photographic laboratory with multiple stations, each processing machine, whether it be a splicer, a developer, a printer etc., generally requires its own containers to be used. These are structured and shaped to be adapted to the particular machine and to carry out automatic or manual operations of loading/unloading the photographic material to be processed.

In systems to manage and move photographic material such as are known to the state of the art, after the photographic material has been sub-divided and sorted according to the type of client, the format or the process, it is removed from the envelopes or the other containers used by the clients to hand in the material, and it is then sent to a first machine, or splicer to make up homogeneous reels.

The photographic material being processed at the various stations is followed in parallel by the appropriate, previously compiled work card, or other kind of paper record, on which there is the data required to identify the specific material and to programme the various processing machines correctly.

The envelope used substantially follows all the processing steps right until the last packaging station, where it is re-used to contain the photographic product which is delivered back to the client.

The photographic material leaving each individual processing machine is either transferred directly, or placed by the worker manually or automatically by the machine itself, in a container structured to contain the product leaving the machine, whether it be paper, film or otherwise, and/or to adapt itself to the structure of the following processing machine to which it is destined.

The preliminary sorting of the material, the subsequent removal of the rolls from the envelopes or containers, the feeding of the splicer and the parallel journey of the envelopes with the identification data for the final packaging of the finished material require a high number of manual operations and a great deal of care and therefore are easily subject to errors.

In order to reduce the probability of errors, the more advanced photographic laboratories use identification means which can be read automatically, for example a bar code, which are marked simultaneously on the envelope, the photographic material to be processed, for example the exposed films or photographic prints, and on the processed photographic material.

The identification means make it possible to automatically transfer the identification data of the photographic material being processed from the splicer to the other processing machines as far as the packaging machine, by means of an external data processing unit.

The identification means also make it possible, when processing is complete, to check that the envelope, the film and the prints all correctly correspond, possibly by automatically reading the identification means.

However this solution only partly reduces the number of manual operations required, and the probability remains of errors in the packaging step of the processed photographic material.

To be more exact, this solution still requires a high number of manual operations such as: the application by the worker in the commercial outlet dealing with the collection of the rolls, of the identification data of the client and the type of processing and the format, the preliminary sorting of the envelopes containing the photographic material according to the type of processing, the transfer of the material from the envelopes to the splicer, the setting of the processing machines and the transfer of the data from one machine to another, the final packaging of the processed material back into its original envelope, the transfer of the envelopes from the intake to the outlet of the processing steps.

Moreover, there is also the problem that it is necessary to use specific collection containers for each type of processing machine, and sometimes for machines of the same type but made by different producers.

Some solutions in the state of the art have proposed using containers with coded locations, used during the collection step in automatic devices.

For example, EP-A-234.833 describes a device to collect and distribute photographic material where, in the collection section, there are circular, rotating containers connected to an insertion slot by means of a slide.

The containers are associated with a data processing and memorization unit consisting of a floppy disk outside the containers.

The containers however are not structured for the automatic extraction of the rolls contained therein, nor to be applied directly on processing machines with the simultaneous transfer of the identification data of the photographic material from the container to the processing machine.

Furthermore, the memorization means are outside the container and must be collected and transported therewith.

U.S. Pat. No. 5,227,823 and DE-A-195 02 826 disclose methods to process photographic material where the data and information about the processing to be carried out on the film are memorized on the roll itself and read during the unrolling of the film from the roll.

EP-A-645.675 and EP-A-576.399 disclose methods to control and manage the processing steps in a processing laboratory for photographic material.

No state of the art document teaches to use containers which can be associated with an automated collection device, where the containers define a plurality of coded locations each of which can be associated with a roll or other support for photographic material to be processed; where the containers are associated with memorization means included on the container itself, and where the containers can be used directly on the processing machines by means of an interface between the memorization means on the container and reader and data processing means on the processing machines.

The present applicant has designed, tested and embodied this invention to overcome the shortcomings of the state of the art and to achieve further advantages.

DISCLOSURE OF THE INVENTION

The purpose of the invention is to achieve containers which can be used both for the automated collection of photographic material from the clients by means of an automatic collection device, and also in at least some of the steps to process and move the photographic material in the processing stations in the photographic laboratory.

The containers according to the invention include memorization means, applied to and solid with the container itself.

According to a variant, the memorization means are of the inductive type, transmitting the signals on a radio frequency.

The memorization means are able to store all the information relating to the identification of the photographic material contained in the relative container; the information can concern, for example, the client, the date and/or time of delivery, the position in the container, the desired processing to be carried out and any other possible information received from the wrapper of the photographic material, for example a roll, or keyed in by the client at the moment of delivery.

The memory means can be interfaced with printing means so that the automatic collection device can issue an identification label which can be used when the processed photographic material is collected.

Once the containers have been removed from the automatic collection device and transferred to the laboratory, or to another body which will process the photographic material, the memorization means are also able to unload this information to the processing machine in order to perform the desired and requested operations.

The invention considerably simplifies the operations to transfer the photographic material from the collection device to the first processing machine, since the material, and all the relative identification data with it, is transferred automatically from the container used for collection to the first processing machine.

This gives a considerable increase in the productivity of the machines, reduces to a minimum the manual operations, such as the preliminary sorting, the separation of the roll from the envelope, the introduction of the rolls into the splicer, and therefore reduces the probability of human errors; it also gives the possibility of continuously monitoring the data relating to current production and processing.

In the following description we shall refer mainly to a photographic laboratory comprising a plurality of processing machines defining individual separate stations, but the concepts can be extended to cover the case of a single integrated machine able to carry out several operations, or the case where the processing to be carried out on the photographic material is a single operation performed by a single machine.

According to a variant, the invention provides a plurality of containers, of which a first type is used to collect material in automatic collection devices and one or more second types used in the various steps of the photographic process to transfer material from one machine to another.

The containers of the first and second type can have a different conformation according to the material they have to contain, such as rolls, strip film, photographic paper, envelopes or otherwise and/or according to the processing machine to which they are destined; however, they include memorization units which are compatible with similar units on the processing machine so as to allow uniformity in the processing and the exchange of data.

At least the containers used for collection cooperate with mechanical opening/closing means which allow the rolls to be placed easily inside, univocally defining the position of the rolls and ensuring that the roll is maintained stably and securely in the position as delivered by the client, which position is memorized by the memorization unit.

The mechanical opening/closing means are activated both when the client delivers the roll to be processed, with the container arranged inside the automatic collection device, and also when the rolls are transferred from the container to the first processing machine for the required processing to be carried out.

In a first embodiment, the container is of the cylindrical type comprising a plurality of containing tubes or columns, in which every tube or column defines on its vertical height a plurality of individual positions which can be matched with one roll only.

The container can be associated with rotation means so as to position the specific tube which has been selected in correspondence with the delivery aperture of the reception device or with the pickup means of the processing machine.

According to a variant, the container is of the type with tubes or adjacent columns and is associated with linear translation means.

The invention enables the processing machines in the photographic laboratory to place the photographic material in, and remove the photographic material from, the containers automatically and according to desired and predetermined criteria.

The invention uses adapter means which make the containers compatible with the mechanics of the machine with which they must be associated and, at the same time, which cooperate with data processing units to transfer information from the memorization unit of the container upstream of the machine to the memorization unit of the container downstream thereof.

The data contained in the memorization units can, if desired, be updated and/or integrated during the processing operations with further data processed by the data processing units in cooperation with the processing machines.

The data can moreover be transferred from the data processing unit of each processing machine to a central command unit, so as to monitor and/or supervise the production and/or to control the machines from afar.

ILLUSTRATION OF THE DRAWINGS

The attached figures are given as a non-restrictive example and show some preferred embodiments of the invention as follows:

FIG. 1 shows a partial section plane of an embodiment of the device to collect photographic material using the containers according to the invention;

FIG. 2 shows an enlarged front view of the detail A of FIG. 1;

FIG. 3 shows a plane view of FIG. 2;

FIG. 4 shows the enlarged detail B of FIG. 2;

FIG. 5 shows a plane view of FIG. 4;

FIG. 6 shows a variant of FIG. 2;

FIGS. 7*a* and 7*b* show, respectively in the closed and open position, the upper end of a container according to the invention in a first embodiment;

FIGS. 8*a* and 8*b* show the steps whereby the container of FIG. 1 is introduced into an automatic collection device or a processing machine;

FIGS. 9*a* and 9*b* show a variant of FIGS. 7*a* and 7*b;*

FIGS. 10*a*–10*d* show the steps whereby the container in FIGS. 9*a,* 9*b* is introduced into and removed from an automatic collection device or from a processing machine;

FIGS. 11*a*–11*c* show a view from above of the open and closed positions of the stopper of the container shown in FIGS. 9*a* and 9*b;*

FIGS. 12*a*–12*c* show a system to remove rolls from the container according to the invention;

FIGS. 13*a* and 13*b* show, in two positions, a variant of the container according to the invention adopting the system shown in FIG. 6;

FIG. 14 shows the system to remove the rolls from the container of FIGS. 13*a* and 13*b;*

FIGS. 15*a*–15*c* show three steps of another variant of the system to remove the rolls from the container according to the invention;

FIG. 16 shows in diagram form a photographic laboratory using the system according to the invention;

FIG. 17 shows the enlarged detail C of FIG. 16.

DESCRIPTION OF THE DRAWINGS

In the attached figures, the reference number 20 denotes generally a device to collect photographic material, in this case rolls 24, according to the invention.

The device 20 comprises a containing structure 22 equipped with a reception aperture 23 into which the client introduces the roll of film 24 to be developed.

Figure 4:
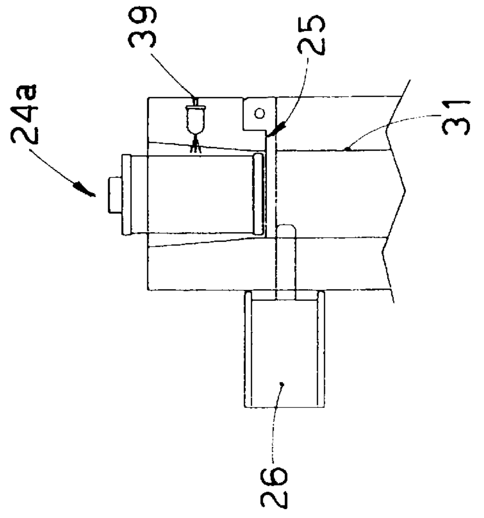
Figure 5:
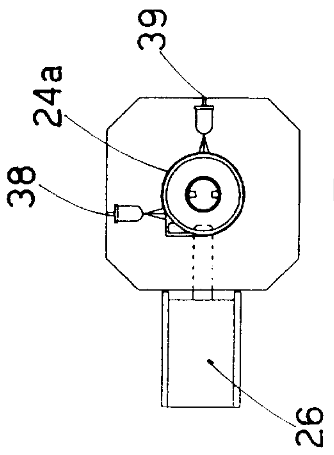

This specific case refers to a standard format roll 24, but the description is valid for every type of photographic material and substantially for any format whatsoever.

The client can have access to the reception aperture 23 only after having inserted his identification card 27 into the slit 28 which is associated with the opportune reader means.

The slit 28 can also be used, after the client has delivered his roll 24, for the device 20 to issue a label or ticket which the client will then use to collect the processed photographic material.

When the roll has been placed inside the reception aperture 23, it is maintained in a loading position (24*a* (FIG. 4) by a door 25 which is opened or closed by an activator element 26.

In the loading position 24a, first sensors 38 read the identification code of the product and second sensors 39 monitor the presence of the roll 24.

The sensors 38 and 39 also control the correct positioning of the roll 24 inside the reception aperture 23 and advise the client of any possible anomalies by means of the control panel 29.

As soon as the client has formulated his request for the desired processing, by means of the control panel 29, the door 25 is opened and the roll 24 passes from the loading position 24*a* through a conduit 31 into the container 30 and occupies a precise and specific storage position 24*b.*

Figure 2:
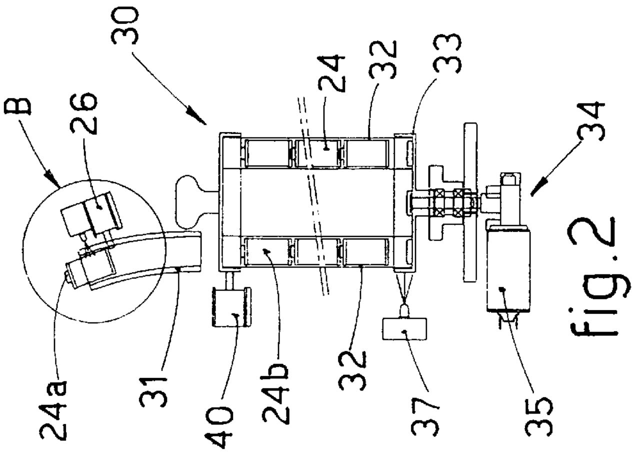
Figure 3:
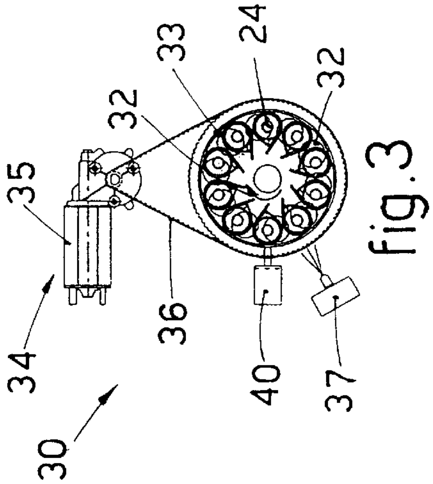
Figure 1:
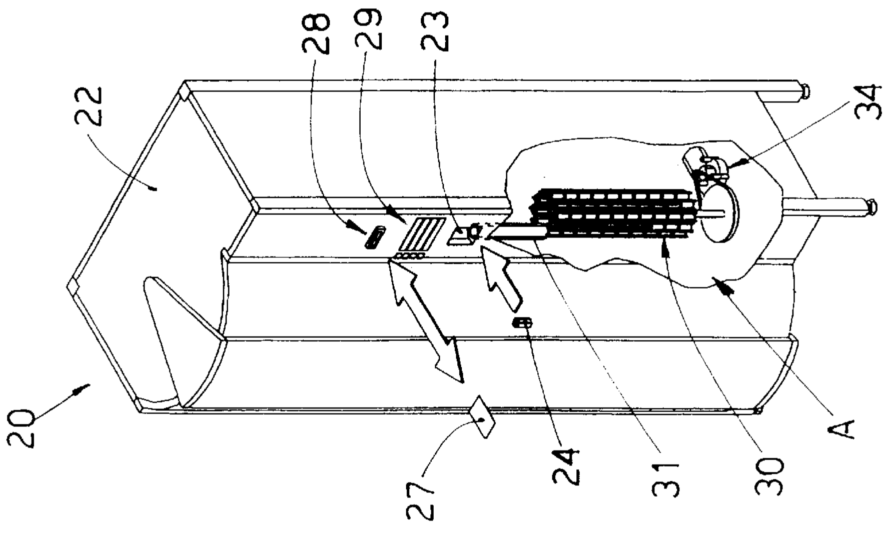
Figure 6:
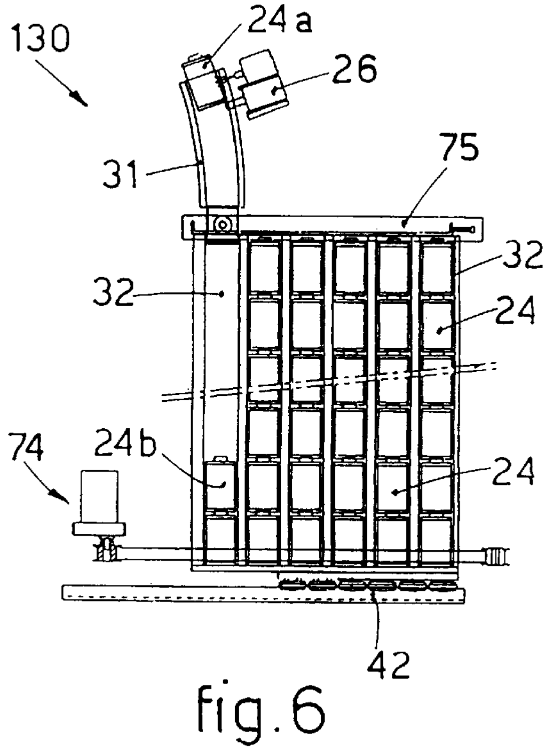

The container 30 consists, in the case of FIG. 2, of containing tubes 32, of a substantially polygonal section arranged parallel in a circular manner on a plate 33; the rotation of the plate 33 is controlled in the embodiment shown in FIG. 3 by a drive unit 34 comprising a motor 35 associated with the plate 33 by means of a belt drive 36.

The rotation of the plate 33 allows any containing tube 32 to be positioned in correspondence with the reception aperture 23 and the conduit 31, thus allowing the rolls 24 to be piled up progressively and sequentially.

The access of the rolls 24 to the containing tubes 32 is regulated by an opening device 40 which allows the roll 24 to enter a tube 32 only when it is aligned with the conduit 31.

The position of every containing tube 32 is identified univocally by a sensor 37 which monitors the angular position of the container 30; the storage position 24*b* of the rolls 24 inside each tube 32 can be identified by the appropriate sensors, as will be seen hereafter, or as a progressive factor according to the sequence of loading procedures performed by the clients.

Figure 7A:
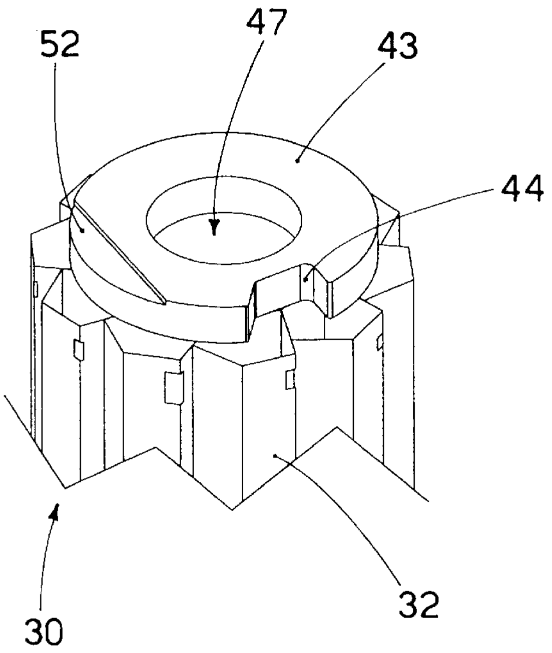
Figure 7B:
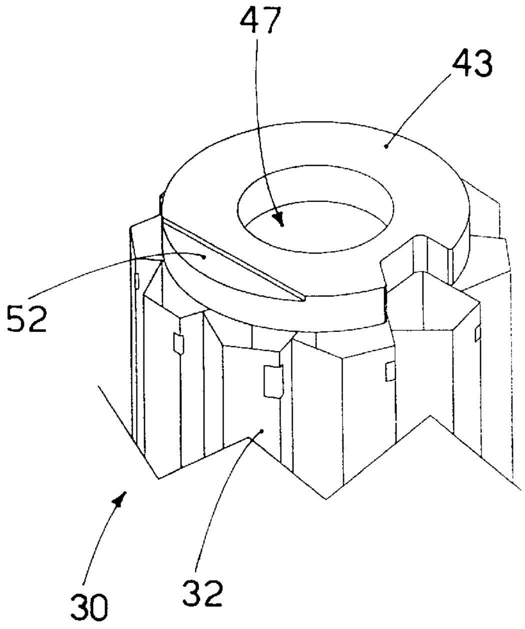

In the variant shown in FIGS. 7*a* and 7*b*, the container 30 has at its upper part a stopper 43 which can be rotated and which has an aperture 44; the aperture 44, in a defined angular position of the stopper 43, allows a tube 32 to be accessed (FIG. 7*b*) while in the closed position, the aperture 44 is positioned astride two tubes 32 and thus closes the container 30 at the top, preventing the rolls 24 contained therein from being removed (FIG. 7*a*). When the container 30 is introduced into the device 20 (FIG. 8*a*), it is retained between an upper cone 45, mounted on a plate 53, and a lower tapered rod with a spring (not shown here).

The upper cone 45 is associated with a motor 46, by means of the gears 49 and 50, and cooperates with the hole 47 on the stopper 43 so as to make the container 30 rotate.

In this position, the upper cone 45 makes the container 30 rotate and unlocks the stopper 43, allowing it to rotate with respect to the container 30, and pushing the elastic pins 48 downwards.

The container 30 rotates, together with the stopper 43 which rotates with it by a process of friction, until the fin 51, mounted on the plate 53, is in contact with the groove 52 on the top part of the stopper 43.

In this position, the aperture 44 of the stopper 43 is positioned in correspondence with the conduit 31 through which the roll 24 may be introduced.

Subsequently, the container 30 is rotated so as to position the mouth of a tube 32 in correspondence with the aperture 44, while the stopper 43 is locked in position by the fin 51.

This allows the rolls 24 to be introduced into the tube 32 of the container 30.

The loading procedure is repeated until a tube 32 is completely full, then the container 30 is rotated and another tube 32 is aligned with the conduit 31 to be filled.

Figure 8B:
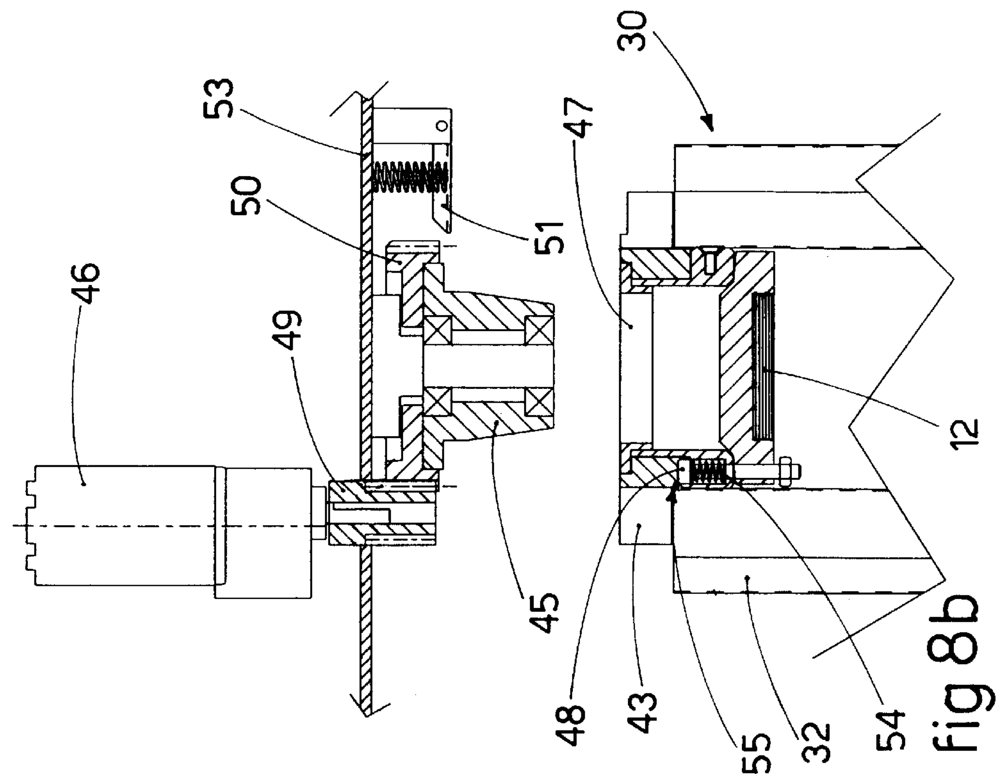
Figure 8A:
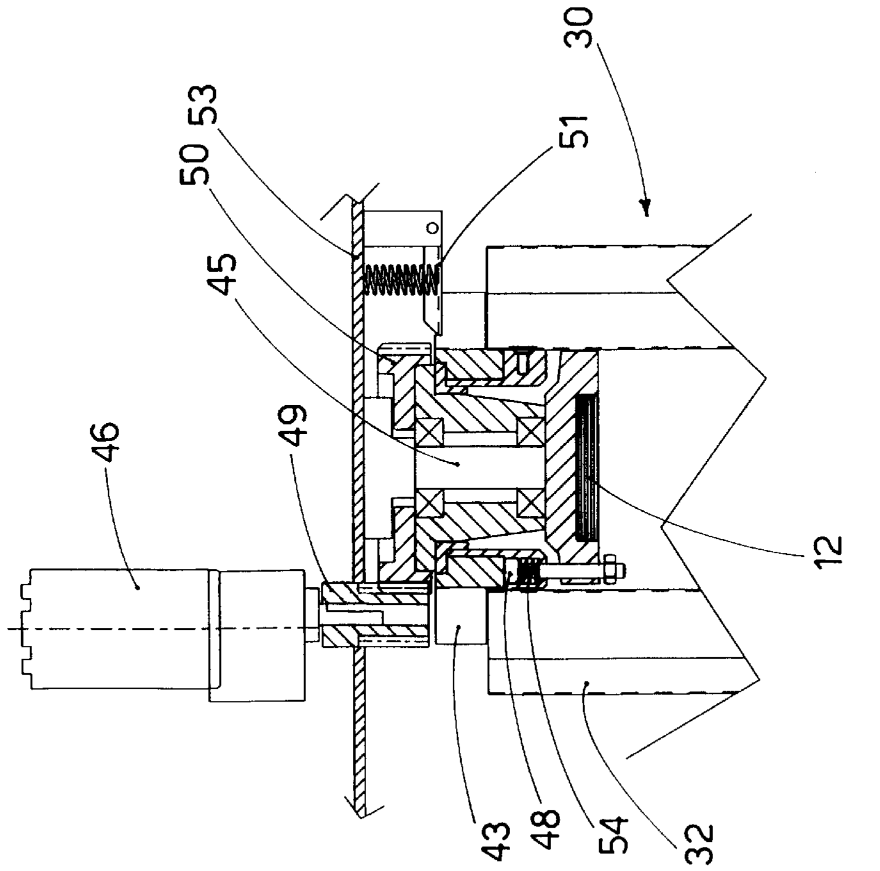

This guarantees an orderly and progressive loading, according to a defined criterion, as every roll 24 is univocally matched with its position in the container 30, the position is memorized in the memorization unit 12, which is shown diagrammatically in FIGS. 8*a* and 8*b*, associated with the container 30.

When the container 30 is completely full, or before it is removed from the device 20, the container 30 is rotated by half a tube 32 so that the aperture is astride two adjacent tubes 32, thus closing the mouth.

At this point, the worker extracts the container 30 by lowering it and releasing it from the upper cone 45. The elastic pins 48 are pushed upwards by the spring 54 and are inserted into the inner hollows 55 provided for this purpose in the stopper 43, thus locking the stopper 43 in the closed position (FIGS. 7*b*, 8*b*).

Figure 9A:
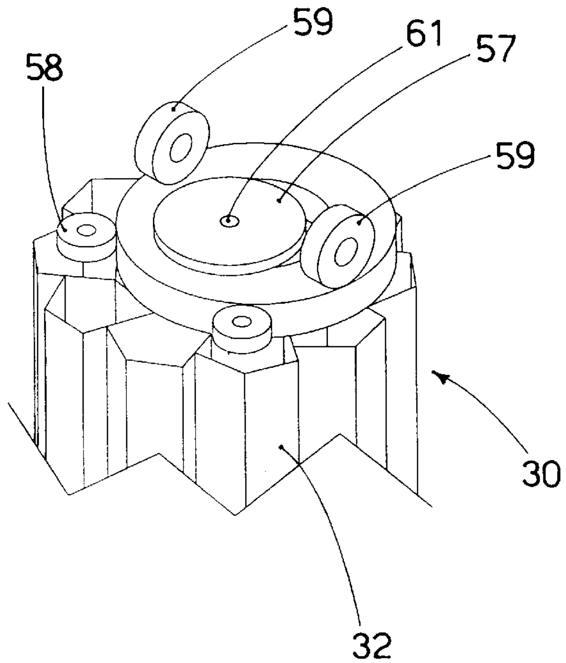
Figure 9B:
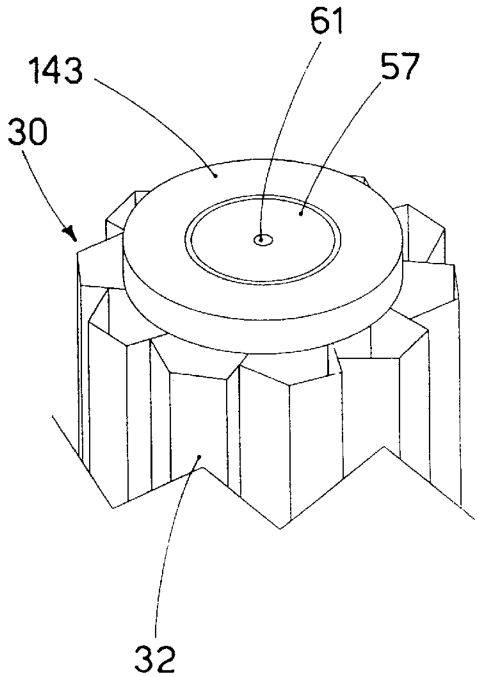

The container 30 can thus be removed from the device 20 and transferred without risk of the rolls 24 falling out. According to the variant shown in FIGS. 9*a* and 9*b*, there is a stopper 143 which can rotate and translate sideways.

The stopper 143 has a first central position wherein it closes the mouths of all the tubes 32 (FIG. 9*b*) and a second position, translated sideways, wherein it frees the mouth of at least one tube 32 so that the rolls 24 may be inserted.

The container 30 is inserted into the device 20 on a horizontally pivoted pin 56 (FIGS. 10*a*–10*d*), inserted axially into the inner hollow of the container 30.

The horizontally pivoted pin 56 makes it possible to connect the motor 46 to the container 30 by means of gears 49 and 50.

The horizontally pivoted pin 56 also serves to raise the central block 57 of the stopper 143, thus leaving the stopper 143 free to translate.

Figures 10A, 10B, 10C, 10D, 11A, 11B, 11C:
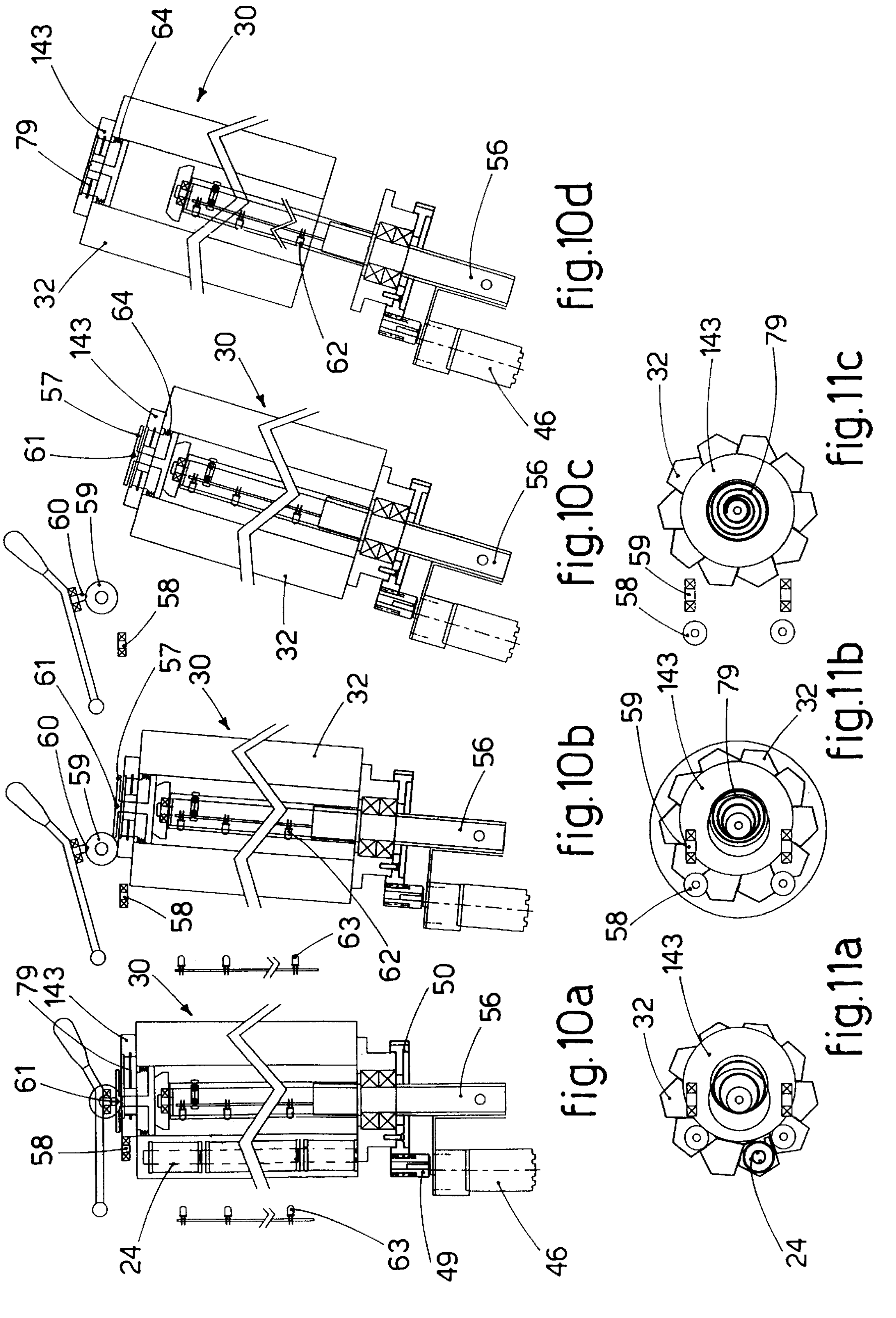

By manually pivoting the container 30 horizontally, the side rollers 58 displace the stopper 143 sideways, compress the spring 79, and free the mouth of a tube 32 arranged in correspondence with the conduit 31, while the upper rollers 59 prevent the stopper 143 from rising (FIG. 10a).

In its end-of-travel position, or loading position, an upper pin 60 is inserted into the hole 61 on the central block 57, locking the container 30 into position (FIG. 10*a*).

In this position, the rolls 24 can be loaded progressively into the tube 32 until it is full, then the container 30 is rotated so as to align another tube 32 with the reception aperture 23 and so on.

In this case, the loading of the rolls 24 inside the tubes 32 is controlled and registered by means of leds 62 mounted on the horizontally pivoted pin 56, which cooperate with sensors 63 mounted outside the container 30.

The position of each roll 24 inside the container 30 can thus be registered and memorized in the memorization unit 12 associated with the container 30.

Once the container 30 is full, it can be removed by releasing the upper pin 60 from the central block 57.

The container 30 is then oscillated sideways on the horizontally pivoted pin 56, releasing the stopper 143 from the side rollers 58 and the upper rollers 59 (FIG. 10*c*).

In this position, the stopper 143 is taken to a central position with respect to the central block 57 by the action of the spring 79, and then the central block is recalled downwards by the spring 64, locking the stopper 143 firmly into its closed position wherein it covers the mouths of all the tubes 32.

In this condition, the container 30 can be removed with no risk of the rolls 24 falling from the tubes 32.

FIGS. 11*a*, 11*b* and 11*c* show respectively the open position of the stopper 143 for the rolls 24 to be inserted, a partly closed position and the closed position wherein the container 30 is removed from the device 20.

Figure 12A:
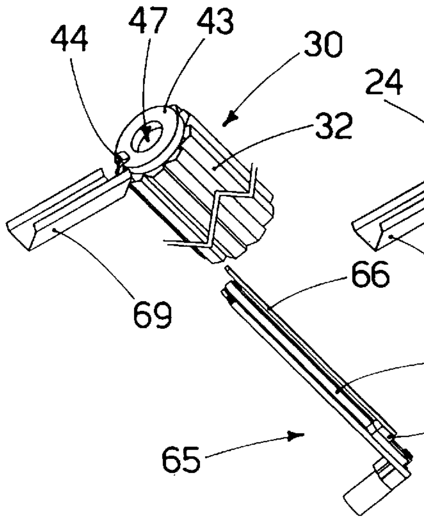
Figure 12B:
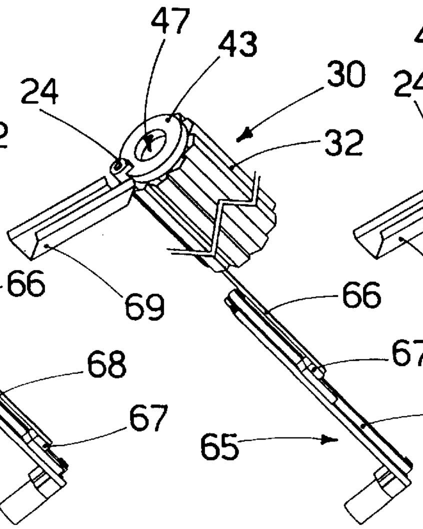
Figure 12C:
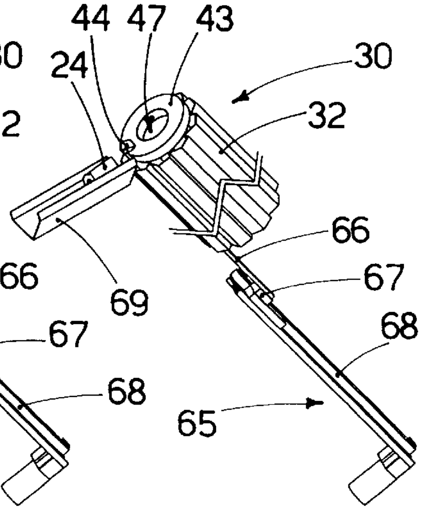
Figure 17:
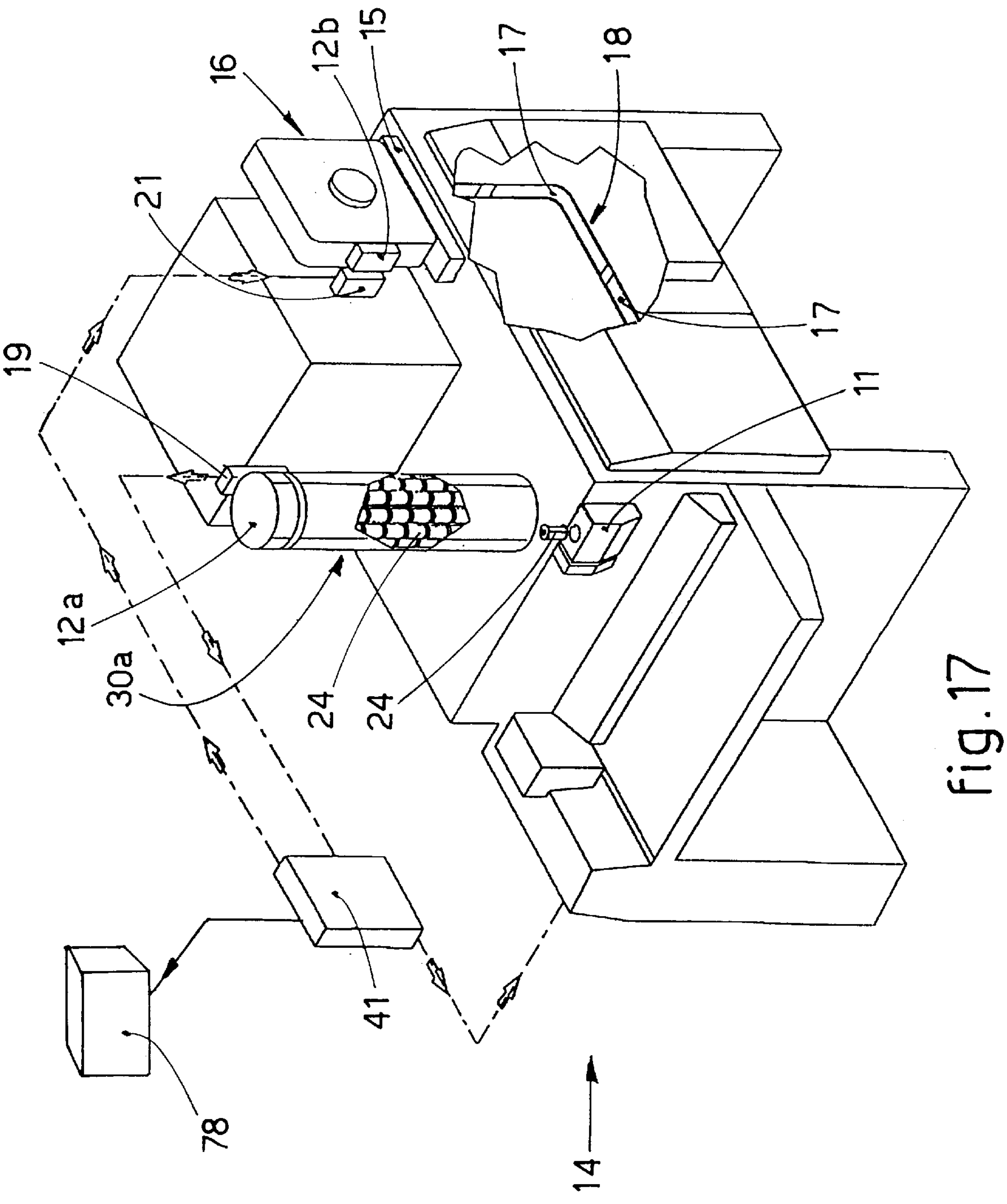

FIGS. 12*a*–12*c* show a first embodiment of a device 65 to extract the rolls 24 from the tubes 32 of the container 30. The device 65 can be mounted, for example, on the first processing machine in the photographic laboratory and serves to extract one roll 24 at a time and feed it to the processing means on the processing machine, for example a splicer 14 (see FIG. 17).

In this case, the device 65 comprises a rod element 66 mounted on a slider 67 which can be moved on a guide 68.

The rod element 66 is inserted, in this case from the bottom, inside one of the tubes 32, using the fissure which is formed between the section of the tube 32 and the lower stopper (not visible in the figures) and the upper stopper 43, and thrusts the roll 24 which is located above until it comes out and falls onto a slide 69.

The processing machine, for example the splicer 14, will be equipped with devices to open the stopper, similar to those described above, so as to bring in this case the aperture 44 into correspondence with the mouth of the selected tube 32.

The slide 69 can be rotated or oscillated to feed the roll 24 correctly to the conveyor systems in the processing machine.

Figure 15A:
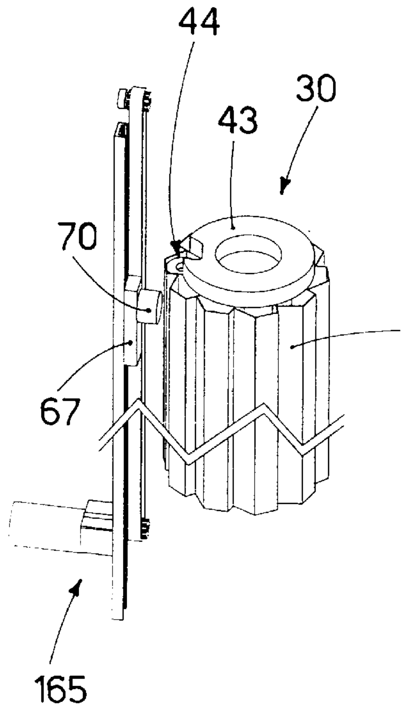
Figure 15B:
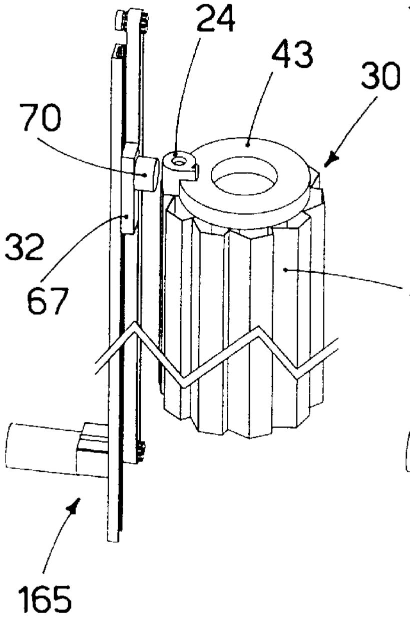
Figure 15C:
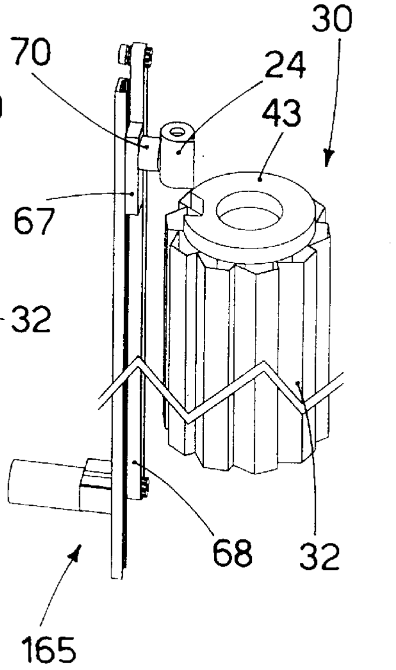

FIGS. 15*a*–15*c* show another extraction device 165 which uses a magnet element 70 mounted on a slider 67 which can be moved on a guide 68 parallel with the tubes 32 of the container 30.

The progressive upward movement of the magnet element 70 allows one roll 24 to be extracted at a time, after the stopper 43 has been positioned in the correct open position; the roll 24 can then be unloaded onto a slide or other feeder element after the magnet element 70 has been disactivated.

Figure 13A:
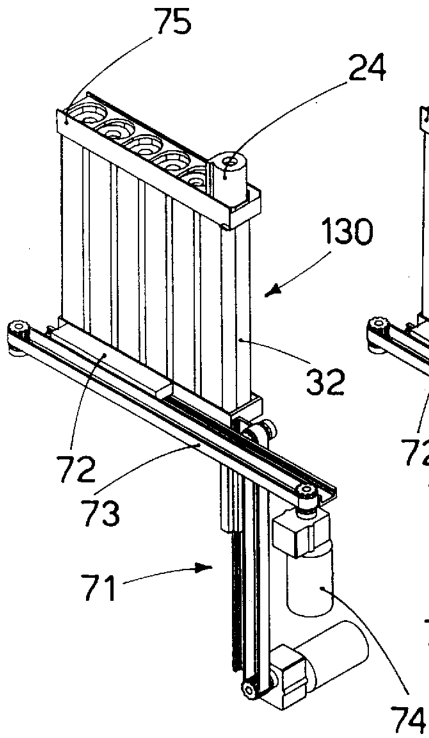
Figure 13B:
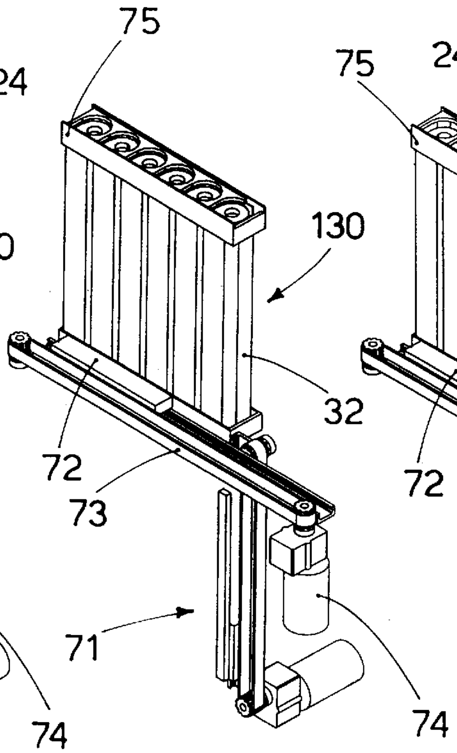

The variant shown in FIGS. 13*a*, 13*b* describes a container 130 of the type with adjacent tubes 32.

The container 130 is associated with a lateral translation device 71, consisting of a slider 72 associated with a belt 73 driven by the motor 74 so as to progressively bring the various tubes 32 into correspondence with the reception aperture 23 so that the rolls 24 may be inserted.

The container 130 has at its upper part a closure bar 75 which can be locked in a position where it covers the mouths of all the tubes 32 when the container 130 is removed from the device 20 and during transportation to the photographic laboratory.

Figure 14:
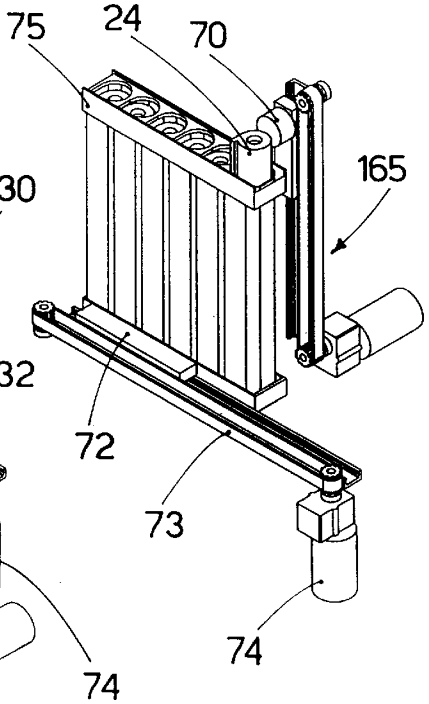

FIG. 14 shows the cooperation between the container 130 and the extraction device 165 including the magnet element 70.

The data of the client as monitored by the card 27, the data concerning any selections or requests formulated by the client by means of the control panel 29, the data read by the sensors 39 and 38 from the rolls 24 and the data relating to the storage position 24*b* of the roll 24 inside the container 30, monitored for example by the sensors 63, are processed by a data processing unit and memorized in a memorization unit 12 solidly associated with the container 30.

Figure 16:
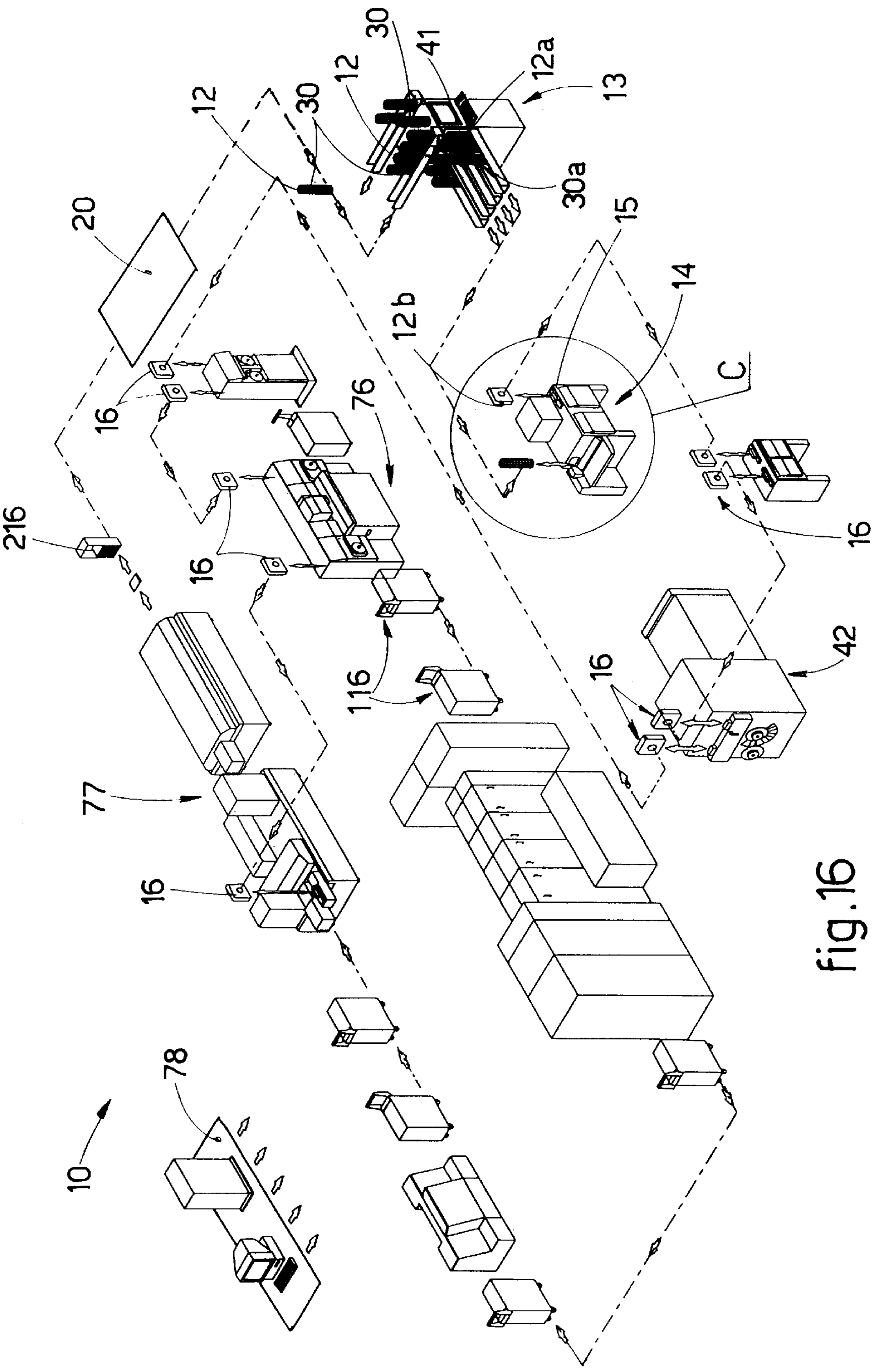

This data is automatically transferred when the container 30 is removed from the device 20 and associated with a processing machine in the photographic laboratory, indicated generally by the reference number 10 in FIG. 16.

In this case, a selector machine 13, equipped with a data processing machine 41 suitable to interface with the memorization unit 12 associated with the container 30 and including its own reading and writing means, empties the containers as they arrive from the collection device 20, selects the rolls 24 according to pre-determined criteria such as for example the type of processing, and transfers the homogeneous rolls 24 into a plurality of containers 30*a*, at least one for each type of process.

The data processing unit 41, after having integrated if necessary the data read from the memorization unit 12 with other data keyed in by the worker, transfers the data to the memorization unit 12*a* of the container 30*a* where the rolls 24 are contained.

The containers 30*a* are then sent, manually or automatically, to a splicer 14 (FIG. 17) equipped with an intake adapter 11 suitable to automatically extract the rolls 24 one by one from the container 30*a*, for example with the device 65 using the rod 66 or the device 165 using the magnet 70, and insert them into the seating of the splicer 14 as soon as it is free.

The adapter 11 will also comprise devices similar to those shown above to open the stopper 43, 143 and to progressively rotate or translate the containers 30*a* to empty them in sequence.

The splicer 14 then splices the relative films 17, forming a continuous and homogeneous strip 18 which is wound into the container 16 in cooperation with an outlet adapter 15.

The identification data of the specific roll 24 selected, contained in the memorization unit 12*a* of the container 30*a*, is acquired by reader means 19 when the roll is extracted; this data is then transferred temporally into the data processing unit 41 of the splicer 14 and cancelled from the memorization unit 12*a* of the container 30*a*.

The data processing unit 41, if so desired, can integrate the data with other processing data, keyed in by the worker or transcribed automatically from the splicer 14, and arrange it to be transferred to the memorization unit 12*b* associated with the container 16, by means of the appropriate writing means 21, when the film 17 corresponding to the rolls 24 is completely wound into the container 16.

This operation of automated, mechanical loading and simultaneous transfer of the relative data is repeated, in a substantially analogous manner, for all the following processing machines of the laboratory, such as the developer 42, the printer 76, the packaging machine 77, etc.

Each of these machines has the opportune intake adapters 11 and outlet adapters 15 which load/unload the photographic material into/from the relative containers and transfer the data.

Each processing machine of the laboratory 10 has its own data processing unit 41 which, using its own reader means 19 and writing means 21, reads, processes, integrates and then transfers the data contained in the memorization unit 12 of the container 30 at the entrance of the machine by means of the adapter 11, into the memorization unit 12 of the container 30 at the outlet of the machine by means of the outlet adapter 15.

Every data processing unit 41 of every processing machine is connected to a central data processing unit 78 which continuously monitors the production and/or controls each individual machine from afar.

In this case, apart from the containers 30 of the type including tubes 32, the laboratory uses other types of containers for the processing machines following the first: containers 16 able to contain the film in continuous strip, containers 116 able to contain photographic paper in strip form and containers 216 able to contain envelopes or other wrappers with the processed material for the clients.

Thanks to the intake adapters 11 and outlet 15 adapters, it is also possible to make the structure of the containers uniform, and no specific conformation is required according to the type and/or origin of the processing machine.

What is claimed is:

1. Container to manage, process and move photographic material, contained in wrappers of a defined form, for example rolls, the container being able to be associated with an automatic collection device to collect from clients photographic material to be processed and also with at least a processing machine to process photographic material, the processing machine including its own data processing unit, the automatic collection device including at least means to recognize the client, means to input commands or requests for the processes to be performed on the photographic material and aperture means for the introduction of the roll, the container being characterized in that it includes a plurality of individually accessible locations to position the rolls in an orderly manner inside the memorization means solid with the container, the memorization means being able to be functionally associated with means to recognize the client of the automatic collection device for the univocal identification of the specific roll and with the data processing unit of the processing machine to transfer the univocal identification of the specific roll, the container including closure means which can be temporally deactivated selectively and cooperate with moving means as a function of the sequential positioning of the container in cooperation with the aperture means for the introduction of the roll and with feeder means at least of the first processing machine, the container cooperating with automatic devices to extract one roll at a time associated at least with the first processing machine (13, 14).

2. Container as in claim 1, in which the closure means include a locked position in the closed position which is functionally associated automatically with the extraction of the container from the automatic collection device.

3. Container as in claim 1, in which the memorization means cooperate with first sensors to read an identification code of the roll.

4. Container as in claim 1, which has a substantially cylindrical conformation with tubes or columns arranged parallel on the circumference.

5. Container as in claim 1, which has a substantially flat conformation with tubes or columns arranged adjacent and parallel.

6. Container as in one of claim 3–5, in which each tube or column has a substantially polygonal conformation.

7. Container as in any one of claim 4, which has a stopper including a first closed position wherein it covers the mouth of all the tubes or columns and a second open position wherein it frees the mouth of a tube or column for the introduction or unloading of a roll.

8. Container as in claim 7, in which the passage from the first to the second position is obtained by the rotation of the stopper with respect to the container, the stopper having an aperture of a size which mates with the mouth of a tube or column.

9. Container as in claim 7, in which the passage from the first to the second position is obtained by means of the lateral translation of the stopper with respect to the container.

10. Container as in claim 7, in which the automatic collection device and at least the first processing machine include an automatic device to move the stopper from the first closed position to the second open position.

11. Container as in claim 1, in which the extraction device comprises thrust means including a rod acting in cooperation with a tube of the container.

12. Container as in claim 1, in which the extraction device comprises magnet means acting on the side of a tube of the container and movable parallel thereto.

13. Container as in claim 1, wherein the means to recognize the client comprise a magnetic or electronic card.

14. System to collect, manage, move and process photographic material contained in wrappers of a defined form, the system including the automated collection of the photographic material in containers inside automatic collection devices and the transfer of the containers to a laboratory for processing, the processing including at least one processing step selected from the group consisting of homogeneous splicing of photographic films, development, printing, and packaging, the steps being performed by one or more processing machines each of which defines a specific processing station, every processing machine including its own data processing unit, the system being characterized in that the same container used to collect the photographic material in the automatic collection device is used at least in the first processing machine of the photographic laboratory, the container being functionally associated at least with the first processing machine to connect a memorization unit which is solid therewith to the data processing unit of the first processing machine, at least the first processing machine including intake adapters which can be temporally associated with the container.

15. System as in claim 13, in which the automatic collection device comprises aperture means for the introduction of the roll, slit means associated with reader means for the introduction of a client's identification card or ticket, one or more containers structured as one or more sections for the orderly containment of a plurality of rolls, means to move the containers suitable to position the sections of the container sequentially in correspondence with the aperture means for the introduction of the rolls, opening means to temporally free the mouth of at least one of the sections of the container for the introduction of the rolls, sensor means to read data on the roll, sensor means to monitor the position of the container, sensor means to monitor the position of the roll inside the relative section of the container, the sensor means and the reader means associated with the slit means cooperating with the memorization unit associated with the container to transfer and memorize all the data and information relating to the roll and its position inside the container.

16. System as in claim 15, in which the slit means can be used to issue a label or ticket to be used for the client to collect his processed photographic material.

17. System as in claim 14, in which at least the first processing machine of the photographic laboratory comprises intake adapter means to position an intelligent container, means to open the stopper of the container, a device to extract the rolls one by one from a section of the container, a data processing unit which can interface with the memorization unit of the container to transfer data and information relating to each roll extracted, means to process the photographic material contained in the roll to perform the necessary operations on the roll and outlet adapter means to load the processed photographic material into the appropriate transfer containers.

* * * * *